United States Patent
Pittman et al.

(10) Patent No.: US 12,212,493 B2
(45) Date of Patent: Jan. 28, 2025

(54) INDUCING DELAY FROM A PEER NODE TO QUANTIFY LATENCY-BASED BEHAVIOR

(71) Applicant: Cisco Technology, Inc., San Jose, CA (US)

(72) Inventors: Randall Benjamin Pittman, Apex, NC (US); Alpesh S. Patel, Cary, NC (US); John Michael Lake, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 17/863,879

(22) Filed: Jul. 13, 2022

(65) Prior Publication Data

US 2023/0362094 A1 Nov. 9, 2023

Related U.S. Application Data

(60) Provisional application No. 63/338,161, filed on May 4, 2022.

(51) Int. Cl.
*H04L 47/11* (2022.01)
*H04L 47/2416* (2022.01)
*H04L 47/35* (2022.01)

(52) U.S. Cl.
CPC .......... *H04L 47/11* (2013.01); *H04L 47/2416* (2013.01); *H04L 47/35* (2013.01)

(58) Field of Classification Search
CPC ....... H04L 47/11; H04L 47/2416; H04L 47/35
See application file for complete search history.

(56) References Cited

U.S. PATENT DOCUMENTS

| | | | |
|---|---|---|---|
| 2006/0092845 A1 | 5/2006 | Kwan et al. | |
| 2008/0019278 A1* | 1/2008 | Niemczyk | H04L 43/0852 370/238 |
| 2016/0173383 A1 | 6/2016 | Liu et al. | |
| 2016/0344636 A1 | 11/2016 | Elias et al. | |
| 2020/0076697 A1* | 3/2020 | Day | H04L 65/765 |
| 2020/0259755 A1* | 8/2020 | Wang | H04L 47/283 |
| 2020/0280518 A1* | 9/2020 | Lee | H04L 47/115 |
| 2022/0046465 A1 | 2/2022 | Zhang | |

FOREIGN PATENT DOCUMENTS

WO WO2021244240 A1 12/2021

* cited by examiner

*Primary Examiner* — Farzana B Huq
(74) *Attorney, Agent, or Firm* — Lee & Hayes, P.C.

(57) ABSTRACT

Techniques and architecture are described for inducing precise delays in a network device (network node) that has the capability to act on packets/traffic flows based on policy configurations of the network device and delays experienced by traffic in the network device. This capability may be used for testing and verification of the network device to verify that the network device meets the configured policies. Additionally, this capability may be utilized in an operational network to selectively induce delays and measure its impact for purposes such as, for example, planning, stress testing, resiliency, etc.

18 Claims, 4 Drawing Sheets

INDUCING DELAY FROM A PEER NODE TO QUANTIFY LATENCY-BASED BEHAVIOR

PRIORITY CLAIM AND CROSS-REFERENCE TO RELATED APPLICATIONS

This application is a non-provisional of, and claims priority under 35 USC § 119(e), to U.S. Provisional Patent Application No. 63/338,161, filed May 4, 2022, which is fully incorporated by reference herein as if fully set forth below.

TECHNICAL FIELD

The present disclosure relates generally to inducing delay in a network device of a network to evaluate latency-based behavior at the network device, and more particularly, to inducing a precise latency in a network device, e.g., a router, a switch, etc., and observing functions/behavior in the network, e.g., at one or more network devices.

BACKGROUND

Routers support a lot of different types of traffic management, often in terms of buffer sizing. In particular, one feature is age based actions that can be performed on traffic, e.g., how long has the traffic been sitting in the router so one can track the age of the traffic. If a packet has been traversing the router for more than a predetermined amount of time, one can trigger different events or different classifications, e.g., in a networking system, a network node (network device) can modify the behavior of a packet based on latency experienced in the node, per the configured policy. For example, the packet can be explicit congestion notification (ECN) marked. Additional examples of the modified behavior could be dropping a packet or device dependent behavior, e.g., buffer the packet in a low bandwidth/speed, but high density memory.

It is difficult with such a small timescale within the router to measure that a feature in the hardware of the router is providing congestion management properly, e.g., packet ECN marking, selective dropping of packets, etc. It is challenging to induce precise delays in the forwarding path of a network device and thus test that the device is behaving as configured. As a side note, the impetus in a network forwarding path is to minimize delay in the forwarding path and the network devices typically do not provide mechanisms to induce delays. In particular, it is difficult to cause a particular latency for traffic in a router in order to verify the bahavior of the router.

An example of attempting to induce latency or delay in a router includes flooding the router with traffic. This method provides no timing though (i.e. one does not know the exact latency or the exact length of time of delay caused) and results in simply flooding the router with traffic and filling up buffers. Another example of attempting to induce latency or delay in a router includes disabling an egress port, e.g., turning off the egress port of the router, and causing the router to stop transmitting. This approach again results in no timing and simply flooding the router with traffic and filling buffers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
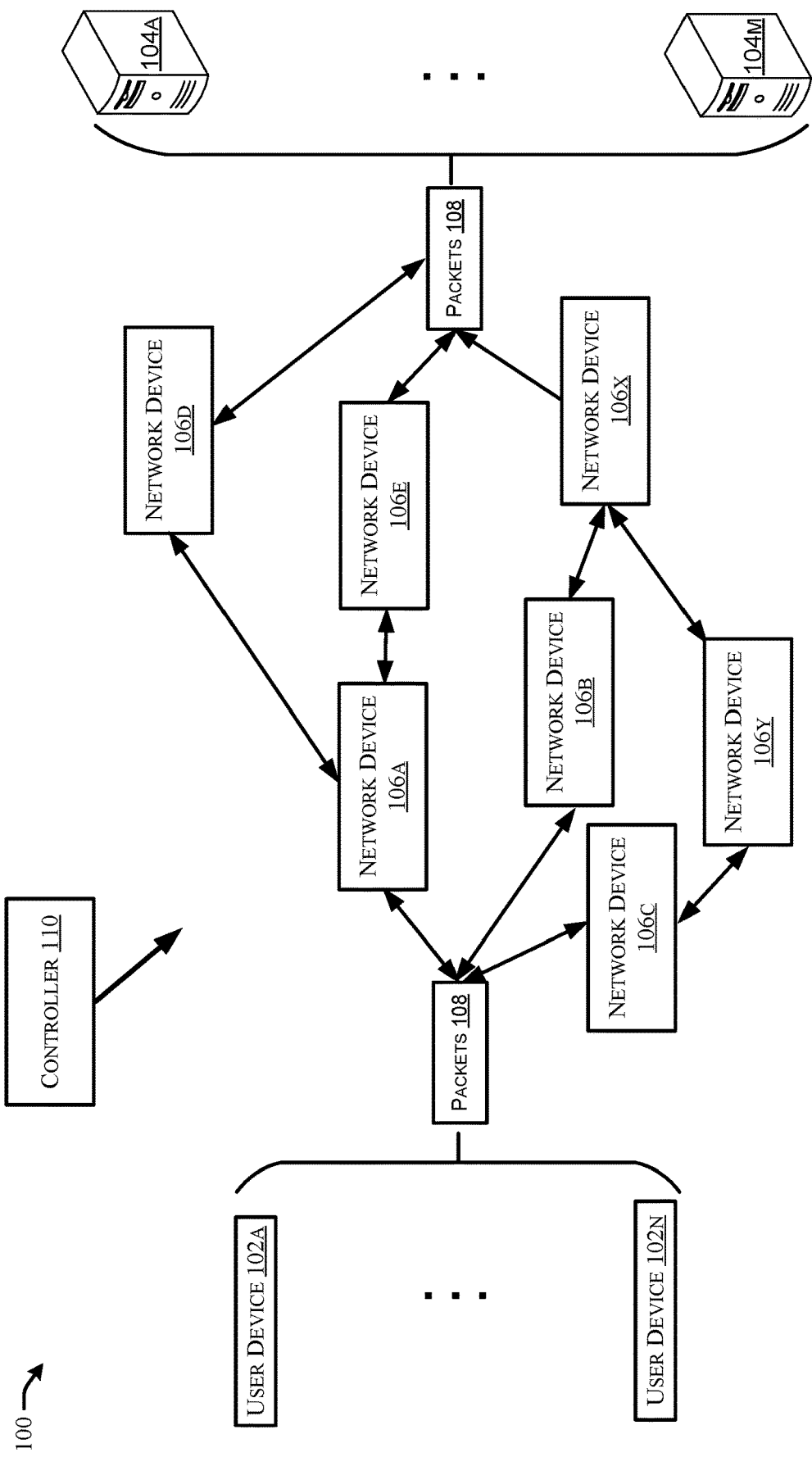
FIGS. 1A and 1B schematically illustrate an example network arrangement of a portion of a network wherein delay is induced in one or more network devices of a network to evaluate latency-based behavior within the network, e.g., at one or more network devices.

The present disclosure describes techniques and architecture for inducing precise delays in a network device (network node) that has the capability to act on packets/traffic flows based on policy configurations of the network device and delays experienced by traffic in the network device. This capability may be used for testing and verification of the network device to verify that the network device meets the configured policies. Additionally, this capability may be utilized in an operational network to selectively induce delays and measure its impact for purposes such as, for example, planning, stress testing, resiliency, etc.

In particular, some networking devices, e.g., routers, switches, etc., provide age based behaviors to assist in traffic congestion management in a network. As previously noted, intentionally slowing data-path traffic at the microsecond granularity through a networking device is challenging. The ability to inject/incur precise delay is required to verify the network device's traffic aging/delay behavior and observe or measure the actions the network device takes when the delay is experienced.

In configurations, using priority based flow control (PFC) streams with precisely selected quanta sent from a peer node, as well as by controlling the rate of PFC frames, the techniques and architecture described herein are able to induce such minute latencies to consistently and predictably exercise the traffic aging functionality of the network device. Once precise latency has been induced, the effects may be observed/measured for the specific behavior at the network device or the peer device (e.g., drop count behavior at the network device and mark count behavior at the network device or at the peer node).

High speed network devices, e.g., routers and switches, move packets with latencies on an order of microseconds and nanoseconds. The network devices generally have memory to buffer a few microseconds worth of inflight traffic due to congestion. When the network device is congested, the time it takes for a packet to traverse through the network device increases and this is referred to increased latency/delay. There are network devices that define policies based on latency experienced. An example of such policies are to drop a certain percentage of packets, mark a certain percentage of packets based on latency experienced (e.g., ECN marking of packets), or to move the packets to a lower speed but higher capacity memory subsystem, which may or may not be part of the network device. Since the intent of the network device is to incur minimal latency and the latency is on the order of nanoseconds to low microseconds, the challenge is how to induce precise latency to observe the behavior of the network device in regards to the configured policies.

The techniques and architecture described herein provide a mechanism to induce precise latency in a network using the IEEE 802.1qbb protocol (PFC) and thus force the device to act on the policies configured for the specific latency (interval). The mechanism described introduces latency at a granular level, targeting only the flows for which the impact of the policy configured is to be measured.

The IEEE 802.1qbb specification defines the PFC capabilities to enable flow control per traffic class on IEEE 802 point-to-point full duplex links. PFC defines two protocol frames, a XON frame via which the sender tells the receiver that it is permissible to send the traffic on the specific traffic streams (up to 8) indicated in the frame. A second frame is the XOFF frame where the sender asks the receiver to stop sending traffic for one or more (up to 8) traffic streams on a port/queue combination for a specified duration of time. The time duration is specified for each of the streams. The duration is specified in terms of pause quanta.

The techniques and architecture described herein use the pause quanta to cause precise delays in the queueing pipeline at the local network device (node) receiving the XOFF. In configurations, the behavior of the network device is then measured when it has been subjected to precise delays. The measurement may be done at the local network device (node) or at the peer network device (node) that is instructing the local network device to pause the traffic on a port and traffic class.

The techniques and architecture described herein may use the XOFF frame of PFC protocol specification to cause the local network device to pause the transmission of traffic on a specific port/traffic class for a precise duration.

The techniques and architecture described herein then observe the local network device behavior due to this precise pause by measuring the internal state or by making an observation or measurement externally. The precise duration to pause the traffic stream may be controlled based on the speed of the port on the local network device.

As a first use application, a peer network device (e.g., a test node) sends PFC XOFF frames to induce specific delay at the local network device and then measures the percentage of packets that are ECN marked from the local network device. This use application may be used to measure the accuracy at which the local network device is able to mark the packets based on the delay. With a known traffic rate and known policy of marking for a particular delay encountered, the marking accuracy may be verified by controlling the delay and measuring the percentage of packets marked and then checking against the policy configured on the local network device. This mode of using PFC to test the behavior of the local network device by finely controlling the delay in the local network device only for a particular stream is unique.

An additional use case is to measure the effectiveness of marking of packets on the network or specific segments of the network. A node may expose an application programming interface (api) that may be used by the controller to inject PFC frames to induce delay in a next hop node of the network. The node experiencing the delay will start marking packets in accordance with the probability defined in its configured policy. The ECN marking may be propagated to the source and the source may rate limit itself. The controller can use this for experimentation or in production networks/segments to induce congestion artificially to observe the effects of congestion or to learn how the traffic patterns change in the presence of congestion. This may be used to create a knowledge base of observed behavior to help with mitigation of meltdown scenarios in realtime when certain network choking observations are made. This feature requires actual hardware, e.g., network devices, and cannot be simulated in a virtual environment.

In particular, it is possible to issue very precise latencies into a network device to cause it to pause its transmissions for a very precise amount of time with the already existing PFC functionality that is already present in a lot of network devices. This may be done in order to induce latency in a very precise manner into a queuing system, e.g., buffers, inside a network device to test age-based behaviors for a router. While the techniques and architecture described herein are described primarily with respect to PFC protocol, the techniques and architecture described herein are applicable to any protocol that can set a delay in network devices. The net result of what it applies to is any type of traffic or device behavior that reacts based on how long packets have been sitting in a network device. For example, a lot of network devices are configured to perform conditional packet marking and probabilistic packet marking based on an exact latency in terms of microseconds, e.g., how long has the packet been sitting in the network device.

Addditionally, it needs to be possible to measure the effect that the network device is having on the packet. Typically, network devices provide such a mechanism, e.g., a counter that indicates that a network device experienced this amount of latency and therefore performed this particular action. Thus, in configurations, the counter is read and it is observed that the particular action has occurred a particular number of times. It can then be determined if the latency is being induced correctly and that packets are experiencing latency. After that, it can be verified that the network device is behaving appropriately, e.g., in accordance with its configuration, in the face of delays to packets. It is known how network devices are configured and that latency can be induced that will trigger different thresholds and different actions based thereon.

As an example, a method may include providing a network comprising one or more network devices. The method may also include inducing a precise latency within the network at at least one network device of the one or more network devices. The method may further include based at least in part on the precise latency induced within the network, determining congestion at the at least one network device of the one or more network devices. The method may additionally include based at least in part on determining congestion at the at least one network device of the one or more network devices, evaluating one or more functions of the at least one network device of the one or more network devices.

In configurations, evaluating one or more functions of the at least one network device of the one or more network devices comprises evaluating marking of packets within the at least one network device of the one or more network devices as having encountered congestion.

In configurations, evaluating one or more functions of the at least one network device of the one or more network devices comprises evaluating selective dropping of packets.

In configurations, evaluating one or more functions of the at least one network device of the one or more network devices comprises evaluating moving of packets from one part of the at least one network device of the one or more network devices to another part of the at least one network device of the one or more network devices.

In configurations, evaluating moving of packets from one part of the at least one network device of the one or more network devices to another part of the at least one network device of the one or more network devices comprises moving of packets from low volume, high speed memory of the at least one network device of the one or more network devices to high volume, low speed memory of the at least one network device of the one or more network devices.

In configurations, inducing the precise latency within the network at at least one network device of the one or more network devices comprises providing one or more pause frames to an upstream network device to pause traffic from the upstream network device to the at least one network device of the one or more network devices, and based at least in part on one of (i) expiration the one or more pause frames or (ii) ending providing of the one or more pause frames to the upstream network device, allowing traffic to flow from the upstream network device to the at least one network device of the one or more network devices.

In configurations, an operating protocol within the network comprises a priority-based flow control (PFC) protocol.

In configurations, inducing the precise latency within the network at at least one network device of the one or more network devices comprises inducing the precise latency within the network at multiple network devices.

In configurations, the method may further include based at least in part on evaluating one or more functions of the at least one network device of the one or more network devices, troubleshooting the at least one network device of the one or more network devices.

Thus, controlled latency may be induced, for example using PFC, and then the behavior may be measured given that the controlled latency is induced (measure the behavior). Every normal operating network device experiences latency from time to time. Minimal latency is generally on the order of nanoseconds to a few microseconds. The techniques and architecture described herein disturb this state and put the network device in a different state and measure whether the network device is behaving as configured and/or expected or not. The functions of the network device may be measured. For example, a first function includes packet marking; a second function includes selective packet dropping; and a third function includes moving packets from a very high speed memory that is on a die to an off-die memory, which is a little bit slower and voluminous but which is cheaper. The first two functions may be measured externally while the third function may not be measured externally so there is a need to induce latency.

The techniques described herein may be performed by a system and/or device having non-transitory computer-readable media storing computer-executable instructions that, when executed by one or more processors, performs the method described above.

EXAMPLE EMBODIMENTS

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A schematically illustrates a portion of a network 100. The network 100 includes one or more user devices 102a, . . . , 102n (referred to singularly herein as user device 102 or collectively herein as user devices 102) that may be used by users (not illustrated) to access and/or obtain a network service or application from one or more servers 104a, . . . , 104m (referred to singularly herein as server 104 or collectively herein as servers 104). The servers 104 may be part of the network 100 or may be part of one or more different networks (not illustrated). The network 100 includes one or more network devices 106a, . . . , 106x, e.g., routers, switches, etc., (referred to singularly herein as network device 106 or collectively herein as network devices 106) that route traffic (e.g., packets 108) from the one or more user devices 102 to the one or more servers 104. The network 100 may also include a controller 110. The network 100 may represent a fabric network, an extended network, or an external network.

As previously noted, some networking devices 106 provide age based behaviors to assist in traffic congestion management in the network 100. As previously noted, intentionally slowing data-path traffic at the microsecond granularity through a network device 106 is challenging. The ability to inject/incur precise delay is required to verify the network device's traffic aging/delay behavior and observe or measure the actions the network device 106 takes when the delay is experienced.

In configurations, using priority based flow control (PFC) streams with precisely selected quanta sent from a peer node, e.g., a peer network device 106, in the network 100, as well as by controlling the rate of PFC frames, minute latencies may be induced to consistently and predictably exercise the traffic aging functionality of a particular network device 106. Once precise latency has been induced, the effects may be observed/measured for the specific behavior at the particular network device 106 or the peer network device (e.g., drop count behavior at the particular network device 106 and mark count behavior at the particular network device 106 or at the peer network device 106).

High speed network devices 106, e.g., routers and switches, move packets 108 between user devices 102 and servers 104 with latencies on an order of microseconds and nanoseconds. The network devices 106 generally include memory to buffer a few microseconds worth of inflight traffic (packets 108) due to congestion. When a network device 106 is congested, the time it takes for a packet 108 to traverse through the network device 106 increases and this is referred to increased latency/delay. There are network devices 106 that define policies based on latency experienced. An example of such policies are to drop a certain percentage of packets, mark a certain percentage of packets based on latency experienced (e.g., ECN marking of packets), or to move the packets to a lower speed but higher capacity memory subsystem, which may or may not be part of the network device 106. Since the intent of the network device 106 is to incur minimal latency and the latency is on the order of nanoseconds to low microseconds, the challenge is how to induce precise latency to observe the behavior of the network device 106 in regards to the configured policies.

The techniques and architecture described herein provide a mechanism to induce precise latency in a network using the IEEE 802.1qbb protocol (PFC) and thus force the network device 106 to act on the policies configured for the specific latency (interval). The mechanism described introduces latency at a granular level, targeting only the flows for which the impact of the policy configured is to be measured.

The IEEE 802.1qbb specification defines the PFC capabilities to enable flow control per traffic class on IEEE 802 point-to-point full duplex links. PFC defines two protocol frames, a XON frame via which the sender tells the receiver that it is permissible to send the traffic on the specific traffic streams (up to 8) indicated in the frame. A second frame is the XOFF frame where the sender asks the receiver to stop sending traffic for one or more (up to 8) traffic streams on a port/queue combination for a specified duration of time. The time duration is specified for each of the streams in the XOFF frame. The duration is specified in terms of pause quanta.

The pause quanta may be used to cause precise delays in the queueing pipeline at a local network device (node) 106 receiving the XOFF frame. In configurations, the behavior of the network device 106 is then measured when it has been subjected to precise delays. The measurement may be done at the local network device (node) 106 or at a peer network device (node) 106 that is instructing the local network device 106 to pause the traffic on a port and traffic class.

The XOFF frame of PFC protocol specification may be used to cause the local network device 106 to pause the transmission of traffic (packets 108) on a specific port within the local network device 106/traffic class for a precise duration. The local network device behavior due to this precise pause may be observed by measuring the internal state or by making an observation or measurement externally. The precise duration to pause the traffic stream may be controlled based on the speed of the port on the local network device 106.

Figure 1B:
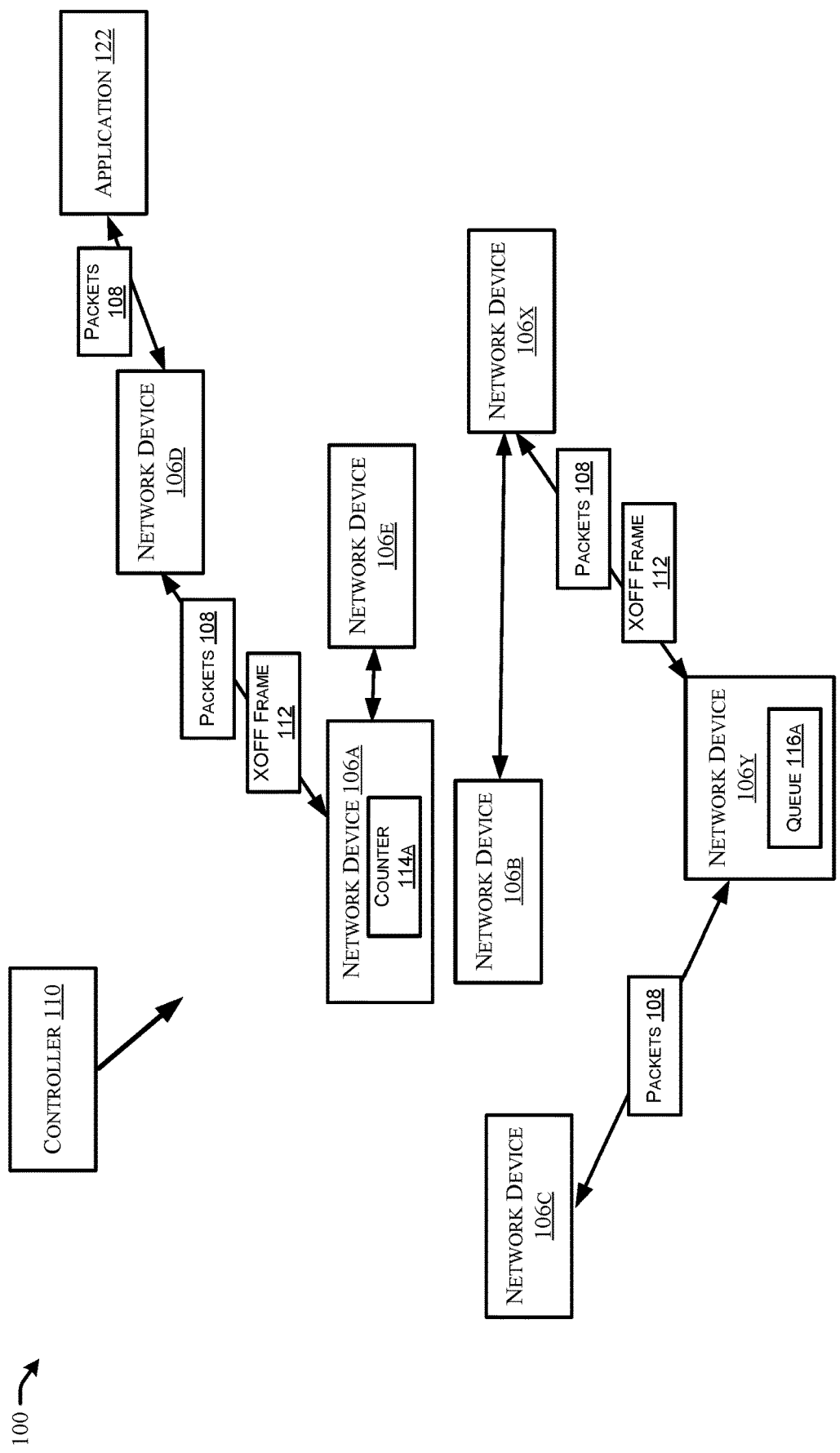

For example, referring to FIG. 1B (which illustrates part of FIG. 1A for clarity), as a first use case, a peer network device (e.g., a test node) 106d sends a PFC XOFF frame 112 to induce specific delay at a local network device 106a. Once specific delay defined by the XOFF frame 112 expires (or the peer network device 106d sends a PFC XON frame to the local network device 106a), traffic (packets 108) may resume and the peer network device 106d may measure the percentage of packets 108 that are ECN marked from the local network device 106a. This use case may be used to measure the accuracy at which the local network device 106a is able to mark the packets 108 based on the induced delay. With a known traffic rate and known policy of marking for a particular delay encountered, the marking accuracy may be verified by controlling the delay and measuring the percentage of packets 108 marked and then checking against the policy configured on the local network device 106a. This mode of using PFC to test the behavior of the local network device 106a by finely controlling the delay in the local network device 106a only for a particular stream is unique.

An additional use case is to measure the effectiveness of marking of packets on the network 100 or specific segments of the network 100. A node exposes an application programming interface (api) that may be used by the controller 110 to inject PFC XOFF frames 112 from network device 112x to induce delay in a next hop node of the network 100. A node experiencing the delay, e.g., network device 106y, may start marking packets in accordance with a probability defined in its configured policy. The ECN marking may be propagated to the source, e.g., network device 106c, and the source may rate limit itself. The controller 110 can use this for experimentation or in production networks/segments to induce congestion artificially to observe the effects of congestion or to learn how the traffic patterns change in the presence of congestion. This may be used to create a knowledge base of observed behavior to help with mitigation of meltdown scenarios in realtime when certain network choking observations are made. This feature requires actual hardware, e.g., network devices 106, and cannot be simulated in a virtual environment.

In particular, it is possible to issue very precise latencies into a network device 106 to cause it to pause its transmissions for a very precise amount of time with the already existing PFC functionality, e.g., XOFF frames, that is already present in a lot of network devices 106. This may be done in order to induce latency in a very precise manner into a queuing system, e.g., buffers, inside a network device 106 to test age-based behaviors for a network device 106. While the techniques and architecture described herein are described primarily with respect to PFC protocol, the techniques and architecture described herein are applicable to any protocol that can set a delay in network devices 106. The net result of what it applies to is any type of traffic or device behavior that reacts based on how long packets have been sitting in a network device 106. For example, many network devices 106 are configured to perform conditional packet marking and probabilistic packet marking based on an exact latency in terms of microseconds, e.g., how long has the packet 108 been sitting in the network device 106.

Addditionally, it needs to be possible to measure the effect that the network device 106 is having on a particular packet 108. Typically, network devices 106 provide such a mechanism, e.g., a counter that indicates that a network device 106 experienced this amount of latency and therefore performed this particular action, e.g., ECN marking of packets 108. Thus, in configurations, the counter 114a within the network device 106a may be read and it may be observed that ECN marking of packets 108 has occurred a particular number of times within the network device 106a. It can then be determined if the latency is being induced correctly and that packets 108 are experiencing latency. After that, it may be verified that the network device 106a is behaving appropriately, e.g., in accordance with its configuration, in the face of delays to packets 108. It is known how network devices 106 are configured and that latency can be induced that will trigger different thresholds and different actions based thereon.

Predominant use cases center around testing to be able to test both a network device 106 and a collection of network devices 106 for their behavior characteristics under congestion experienced at one of the network devices 106. If the pause frame, e.g., XOFF frame, which is the particular piece of PFC, to cause a specific ingress line card to suddenly choke up while all the other line cards continue to feed data through to a particular egress port, then this may be done within a specific amount of latency that is injected while inducing the network 100 into different behaviors from an end-to-end perspective. If this is to be done at a particular point in the network 100, a network device, e.g., network device 106d, inserts a pause frame, e.g., XOFF frame 112, in order to induce marking from a specific client, e.g., network device 106a, without the need to modify the client. To inject an ECN mark frame, the network device 106d may be induced, e.g., by controller 110, to cause ECN marking to happen at its upstream neighbor, e.g., network device 106a, and then pass through to an application 122 on the other end outside the network device 106d, and then test to see if the application actually received an ECN marked packet 108 and then returned it back in such a way that it was its mirror on the other side with the appropriate congestion encountered.

So a simple case may be to take behavior that is intended to continue to do flow control access across either a particular network device 106 or a network of network devices (e.g., network 100) to be able to use the flow control access to test the network, protocol, application layer, operation, behavior, etc., as a collection of use cases. The XOFF frame 112 may designate for different periods of time to induce different amounts of latency. The XOFF frame 112 is the part of the PFC protocol that is the specification of the pause frame and its content. The XOFF frame 112 may be used with non-zero to hold traffic for that amount of time and may be continuous during that amount of time to keep the pause going. The time is either allowed to expire or the network, e.g., the controller 110 and/or peer network device 106*d* stops sending XOFF frames to network device 106*a*. This then allows the traffic to flow again and if the flow pause was long enough such that it triggers the latency driven or age-driven behavior at the local network devie 106*a* that is desired, then it is may be useful and helpful for causing ECN marking of packets 108 at network device 106*a* and for the observations. Thus, this is a way of inducing congestion at a specific point in a network path of network 100.

Queue-depth based ECN marking may also be observed within, for example, the network device 106*a* and may be induced using the same pause frame, e.g., XOFF frame 112. Thus, both these conditions may be induced with the same mechanism, e.g., latency-based marking on a packet 108 and queue-depth based based marking on a packet 108. Thus, congestion is achieved along a particular flow that causes a packet 108 to be ECN marked indicating that it has encountered congestion. This can be because of the queue depth reaching a certain height or depth (whichever way it is defined) or because the packet 108 was delayed long enough in the network device 106*a* while competing for an egress queue within the network device 106*a*. Under normal conditions, the packet 108 would be competing for the egress queue but this very specific flow has been stopped/paused. Thus, congestion does not need to be induced on the entire network 100 but only on a single flow (or a few flows). These techniques may be deployed in both test configurations, e.g., in the field, and also in production environments as well.

Thus, the idea is to use a very specific mechanism for inducing a very specific latency. This produces a hold time within a particular portion of the network 100 and once this is done, there are multiple things that may be examined and thus it is mostly used in either testing a network device 106 is displaying proper behavior in a given configuration or it is testing that a network is configured end-to-end so that the network performs ECN marking of packets 108 appropriately.

The techniques may also test/observe other actions that may be taken by a network device 106 such as selective drops of packets 108. For example, network device 106*d* may send a XOFF frame 112 to network device 106*b*. If a queue 116*y* of the network device 106*y* fills up and is held long enough, then the network device 106*b* may just throw away all of its packets 108 because the packets 108 are too stale. Network device 106*y* expects the appropriate client (e.g., network device 106*c*) or the originator of the packets (e.g., a user device 102) to resend the packets 108. Thus, if there is a TCP connection, for example, and the traffic is followed right there, at this point the network device 106*y* may take a drop action on the packets 108. Thus, the network device 106*y* is being implicitly induced to take a drop action for a certain portion of the traffic flow in order to induce a specific behavior between the client, e.g., network device 106*y*, and between the two ends of the TCP connection. But then the pause may be unasserted (expires, receives a XON frame, etc.) and allow the traffic to resume and presumably it may be observed how fast that connection recovers to its original bit rate. Thus, this is a mechanism for inducing a very specific set of conditions at a very specific point in the network 100 that causes the network device 106*y* to exercise behaviors that are associated with traffic congestion.

The techniques may also test/observe other actions that may be taken by a network device 106 such as moving of packets 108. For example, network device 106*d* may send a XOFF frame 112 to network device 106*y*. If a queue 116*y* of the network device 106*c* fills up and is held long enough, then the network device 106*c* may move packets from a very high speed memory that is on a die of the network device 106*c* to an off-die memory, which is a little bit slower and voluminous but which is cheaper. Thus, the network device 106*c* is being implicitly induced to take a move action for a certain portion of the traffic flow in order to induce a specific behavior. But then the pause will be unasserted (expires, receives a XON frame, etc.) and allow the traffic to resume and presumably be looking at how fast does that connection recovers to its original bit rate. Thus, this is a mechanism for inducing a very specific set of conditions at a very specific point in the network 100 that causes the network device 106*b* to exercise behaviors that are associated with traffic congestion.

The techniques and architecture described herein are primarily used for troubleshooting so the techniques and architecture described herein are primarily used to determine whether or not a network device 106 is behaving as expected based on the induced congestion. If it is determined that a network device 106 is not handling things as it is supposed to be or is configured to, then the result may be to troubleshoot the network device 106 because there is an issue with the network device 106. For example, the network device 106 could be taken offline, could be reconfigured, etc.

Figure 2:
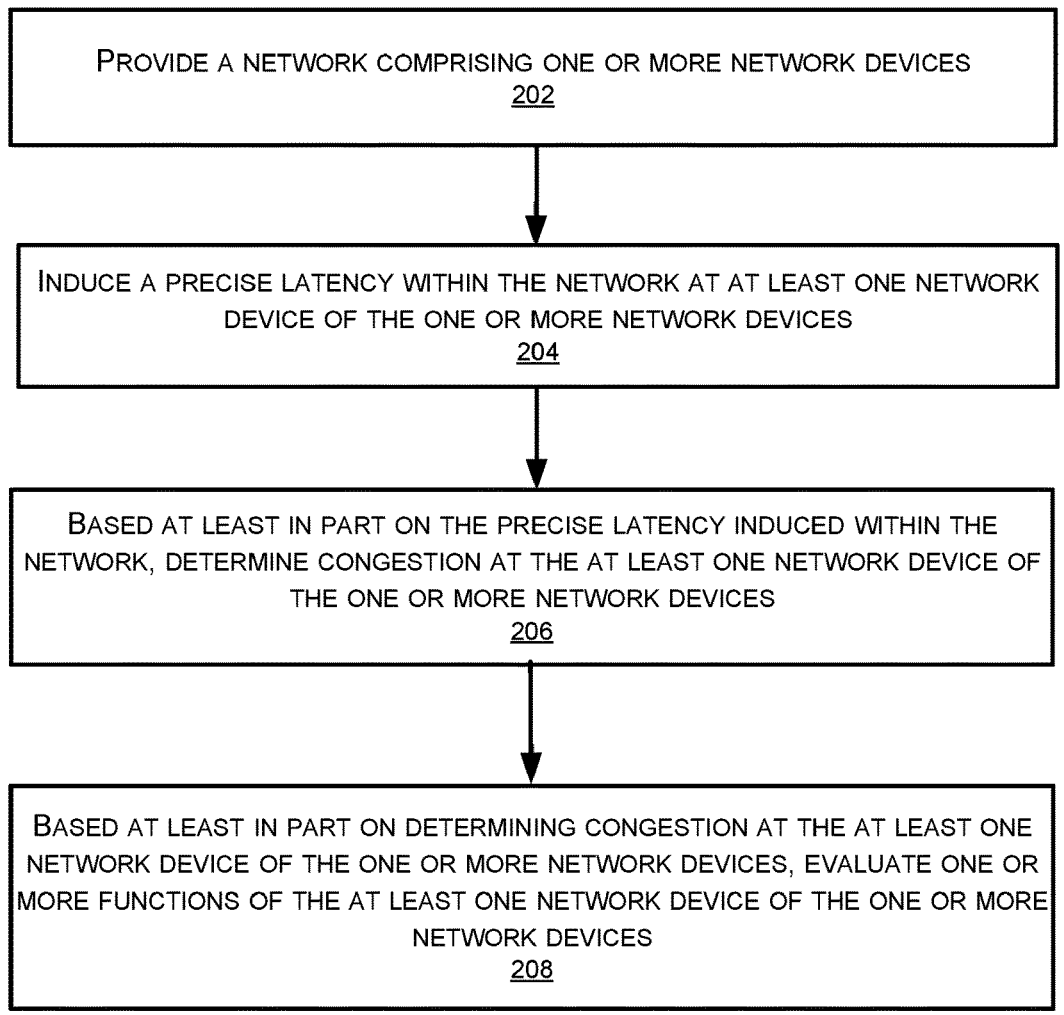
FIG. 2 illustrates a flow diagram of an example method for inducing a precise latency in a network device, e.g., a router, a switch, etc., and observing functions/behavior in the network.

FIG. 2 illustrates a flow diagram of an example method 300 and illustrates aspects of the functions performed at least partly by network devices of a network as described with respect to FIGS. 1A and 1B. The logical operations described herein with respect to FIG. 2 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 2 illustrates a flow diagram of an example method 200 for inducing a precise latency in a network device, e.g., a router, a switch, etc., and observing functions/behavior in the network. In some examples, the method 200 may be performed by a system comprising one or more processors and one or more non-transitory computer-readable media storing computer-executable instructions that, when executed by the one or more processors, cause the one or more processors to perform the method 200.

At 302, a network comprising one or more network devices is provided. For example, the network 100 includes one or more network devices 102, e.g., routers, switches, etc., that move traffic, e.g., packets 108, from user devices 102 to servers 104.

At 304, a precise latency is induced within the network at at least one network device of the one or more network devices. For example, controlled latency may be induced, for example using PFC XOFF frames 112, and then the behavior of network devices 106 may be measured given that the controlled latency is induced (measure the behavior). Every normal operating network device 106 experiences latency from time to time. Minimal latency is generally on the order of nanoseconds to a few microseconds. The techniques and architecture described herein disturb this state and put a network device 106 in a different state and measure whether the network device 106 is behaving as configured and/or expected or not. The functions of the network device 106 may be measured. For example, a first function includes packet marking; a second function includes selective packet dropping; and a third function includes moving packets from a very high speed memory that is on a die to an off-die memory, which is a little bit slower and voluminous but which is cheaper. The first two functions may be measured externally while the third function may not be measured externally so there is a need to induce latency.

At 306, based at least in part on the precise latency induced within the network, congestion is determined at the at least one network device of the one or more network devices. For example, after the controlled latency is induced, for example using PFC XOFF frames 112, then the behavior of network devices 106 may be measured given that the controlled latency is induced (measure the behavior), e.g., congestion is induced at one of the network devices 106.

At 308, based at least in part on determining congestion at the at least one network device of the one or more network devices, evaluate one or more functions of the at least one network device of the one or more network devices. For example, the techniques and architecture described herein disturb a state of a network device 106 and put the network device 106 in a different state and measure whether the network device 106 is behaving as configured and/or expected or not. The functions of the network device 106 may be measured. For example, a first function includes packet marking; a second function includes selective packet dropping; and a third function includes moving packets from a very high speed memory that is on a die to an off-die memory, which is a little bit slower and voluminous but which is cheaper. The first two functions may be measured externally while the third function may not be measured externally so there is a need to induce latency.

Thus, controlled latency may be induced, for example using PFC, and then the behavior may be measured given that the controlled latency is induced (measure the behavior). Every normal operating network device experiences latency from time to time. Minimal latency is generally on the order of nanoseconds to a few microseconds. The techniques and architecture described herein disturb this state and put the network device in a different state and measure whether the network device is behaving as configured and/or expected or not. The functions of the network device may be measured. For example, a first function includes packet marking; a second function includes selective packet dropping; and a third function includes moving packets from a very high speed memory that is on a die to an off-die memory, which is a little bit slower and voluminous but which is cheaper. The first two functions may be measured externally while the third function may not be measured externally so there is a need to induce latency.

Figure 3:
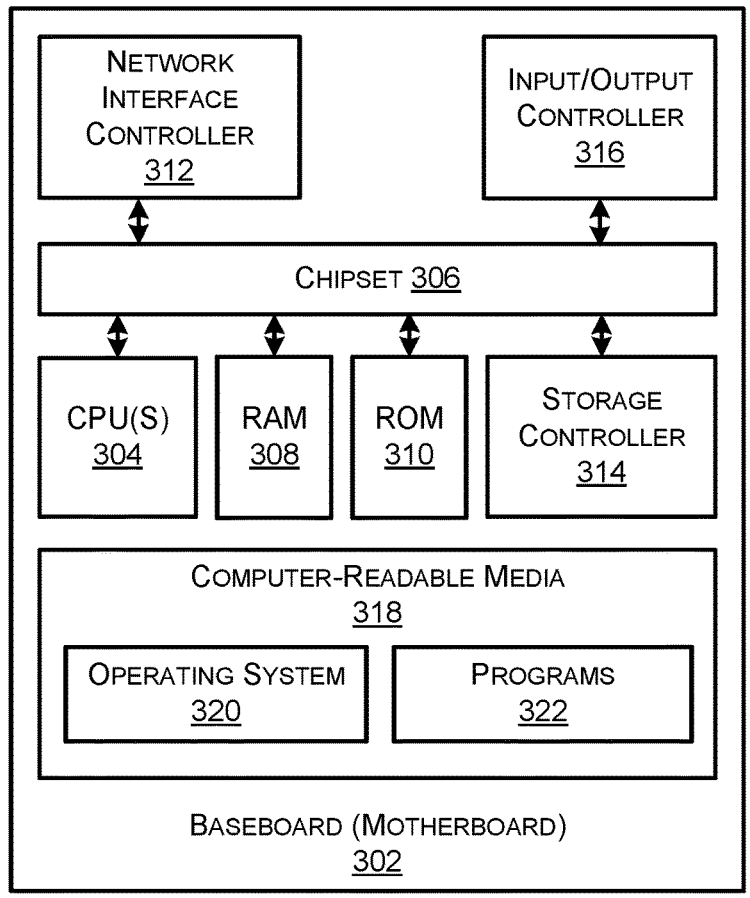
FIG. 3 is a computer architecture diagram showing an example computer hardware architecture for implementing a device that can be utilized to implement aspects of the various technologies presented herein.

FIG. 3 shows an example computer architecture for a computing device 300 capable of executing program components for implementing the functionality described above. In configurations, one or more of the computing devices 300 may be used to implement one or more of the components of FIGS. 1A, 1B, and 2. The computer architecture shown in FIG. 3 illustrates a conventional server computer, workstation, desktop computer, laptop, tablet, network appliance, e-reader, smartphone, or other computing device, and can be utilized to execute any of the software components presented herein. The computing device 300 may, in some examples, correspond to a physical device or resources described herein.

The computing device 300 includes a baseboard 302, or "motherboard," which is a printed circuit board to which a multitude of components or devices can be connected by way of a system bus or other electrical communication paths. In one illustrative configuration, one or more central processing units ("CPUs") 304 operate in conjunction with a chipset 306. The CPUs 304 can be standard programmable processors that perform arithmetic and logical operations necessary for the operation of the computing device 300.

The CPUs 304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 306 provides an interface between the CPUs 304 and the remainder of the components and devices on the baseboard 302. The chipset 306 can provide an interface to a RAM 308, used as the main memory in the computing device 300. The chipset 306 can further provide an interface to a computer-readable storage medium such as a read-only memory ("ROM") 310 or non-volatile RAM ("NVRAM") for storing basic routines that help to startup the computing device 300 and to transfer information between the various components and devices. The ROM 310 or NVRAM can also store other software components necessary for the operation of the computing device 300 in accordance with the configurations described herein.

The computing device 300 can operate in a networked environment using logical connections to remote computing devices and computer systems through a network, such as the arrangement 100. The chipset 306 can include functionality for providing network connectivity through a NIC 312, such as a gigabit Ethernet adapter. In configurations, the NIC 312 a smart NIC (based on data processing units (DPUs)) that can be plugged into data center servers to provide networking capability. The NIC 312 is capable of connecting the computing device 300 to other computing devices over networks. It should be appreciated that multiple NICs 312 can be present in the computing device 300, connecting the computer to other types of networks and remote computer systems.

The computing device 300 can be connected to a storage device 318 that provides non-volatile storage for the computer. The storage device 318 can store an operating system 320, programs 322, and data, which have been described in greater detail herein. The storage device 318 can be connected to the computing device 300 through a storage controller 314 connected to the chipset 306. The storage device 318 can consist of one or more physical storage units. The storage controller 314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 300 can store data on the storage device 318 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 318 is characterized as primary or secondary storage, and the like.

For example, the computing device 300 can store information to the storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 300 can further read information from the storage device 318 by detecting the physical states or characteristics of one or more particular locations within the physical storage units.

In addition to the mass storage device 318 described above, the computing device 300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 300. In some examples, the operations performed by the cloud network, and or any components included therein, may be supported by one or more devices similar to computing device 300. Stated otherwise, some or all of the operations described herein may be performed by one or more computing devices 300 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 318 can store an operating system 320 utilized to control the operation of the computing device 300. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 318 can store other system or application programs and data utilized by the computing device 300.

In one embodiment, the storage device 318 or other computer-readable storage media is encoded with computer-executable instructions which, when loaded into the computing device 300, transform the computer from a general-purpose computing system into a special-purpose computer capable of implementing the embodiments described herein. These computer-executable instructions transform the computing device 300 by specifying how the CPUs 304 transition between states, as described above. According to one embodiment, the computing device 300 has access to computer-readable storage media storing computer-executable instructions which, when executed by the computing device 300, perform the various processes described above with regard to FIGS. 1a, 1B, and 2. The computing device 300 can also include computer-readable storage media having instructions stored thereupon for performing any of the other computer-implemented operations described herein.

The computing device 300 can also include one or more input/output controllers 316 for receiving and processing input from a number of input devices, such as a keyboard, a mouse, a touchpad, a touch screen, an electronic stylus, or other type of input device. Similarly, an input/output controller 316 can provide output to a display, such as a computer monitor, a flat-panel display, a digital projector, a printer, or other type of output device. It will be appreciated that the computing device 300 might not include all of the components shown in FIG. 3, can include other components that are not explicitly shown in FIG. 3, or might utilize an architecture completely different than that shown in FIG. 3.

The computing device 300 may support a virtualization layer, such as one or more virtual resources executing on the computing device 300. In some examples, the virtualization layer may be supported by a hypervisor that provides one or more virtual machines running on the computing device 300 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
providing a network comprising one or more network devices;
inducing a precise latency within the network at at least one network device of the one or more network devices by:
   providing one or more pause frames to an upstream network device to pause traffic from the upstream network device to the at least one network device of the one or more network devices, and
   based at least in part on one of (i) expiration of the one or more pause frames or (ii) ending providing of the one or more pause frames to the upstream network device, allowing traffic to flow from the upstream network device to the at least one network device of the one or more network devices;
based at least in part on the precise latency induced within the network, determining congestion at the at least one network device of the one or more network devices; and
based at least in part on determining congestion at the at least one network device of the one or more network devices, evaluating one or more functions of the at least one network device of the one or more network devices,
wherein an operating protocol within the network comprises a priority-based flow control (PFC) protocol, and wherein the PFC protocol provides a link-level flow control mechanism that is controlled independently for each class of service (CoS).

2. The method of claim 1, wherein evaluating one or more functions of the at least one network device of the one or more network devices comprises evaluating marking of packets within the at least one network device of the one or more network devices as having encountered congestion.

3. The method of claim 1, wherein evaluating one or more functions of the at least one network device of the one or more network devices comprises evaluating selective dropping of packets.

4. The method of claim 1, wherein evaluating one or more functions of the at least one network device of the one or more network devices comprises evaluating moving of packets from one part of the at least one network device of the one or more network devices to another part of the at least one network device of the one or more network devices.

5. The method of claim 1, wherein evaluating moving of packets from one part of the at least one network device of the one or more network devices to another part of the at least one network device of the one or more network devices comprises moving of packets from low volume, high speed memory of the at least one network device of the one or more network devices to high volume, low speed memory of the at least one network device of the one or more network devices.

6. The method of claim 1, wherein inducing the precise latency within the network at at least one network device of the one or more network devices comprises inducing the precise latency within the network at multiple network devices.

7. The method of claim 1, further comprising:
based at least in part on evaluating one or more functions of the at least one network device of the one or more network devices, troubleshooting the at least one network device of the one or more network devices.

8. A system comprising:
one or more processors; and
one or more non-transitory computer-readable media storing computer-executable instructions that, when executed by the one or more processors, cause the one or more processors to perform actions comprising:
   inducing a precise latency within a network at at least one network device of one or more network devices within the network by
   providing one or more pause frames to an upstream network device to pause traffic from the upstream network device to the at least one network device of the one or more network devices, and
   based at least in part on one of (i) expiration of the one or more pause frames or (ii) ending providing of the one or more pause frames to the upstream network device, allowing traffic to flow from the upstream network device to the at least one network device of the one or more network devices;
   based at least in part on the precise latency induced within the network, determining congestion at the at least one network device of the one or more network devices; and
   based at least in part on determining congestion at the at least one network device of the one or more network devices, evaluating one or more functions of the at least one network device of the one or more network devices,
   wherein an operating protocol within the network comprises a priority-based flow control (PFC) protocol, and wherein the PFC protocol provides a link-level flow control mechanism that is controlled independently for each class of service (CoS).

9. The system of claim 8, wherein evaluating one or more functions of the at least one network device of the one or more network devices comprises evaluating marking of packets within the at least one network device of the one or more network devices as having encountered congestion.

10. The system of claim 8, wherein evaluating one or more functions of the at least one network device of the one or more network devices comprises evaluating selective dropping of packets.

11. The system of claim 8, wherein evaluating one or more functions of the at least one network device of the one or more network devices comprises evaluating moving of packets from one part of the at least one network device of the one or more network devices to another part of the at least one network device of the one or more network devices.

12. The system of claim 8, wherein evaluating moving of packets from one part of the at least one network device of the one or more network devices to another part of the at least one network device of the one or more network devices comprises moving of packets from low volume, high speed memory of the at least one network device of the one or more network devices to high volume, low speed memory of the at least one network device of the one or more network devices.

13. The system of claim 8, wherein inducing the precise latency within the network at least one network device of the one or more network devices comprises inducing the precise latency within the network at multiple network devices.

14. The system of claim 8, wherein the actions further comprise:

based at least in part on evaluating one or more functions of the at least one network device of the one or more network devices, troubleshooting the at least one network device of the one or more network devices.

15. One or more non-transitory computer-readable media storing computer-executable instructions that, when executed by one or more processors, cause the one or more processors to perform actions comprising:
- inducing a precise latency within a network at at least one network device of one or more network devices within the network by:
  - providing one or more pause frames to an upstream network device to pause traffic from the upstream network device to the at least one network device of the one or more network devices, and
  - based at least in part on one of (i) expiration of the one or more pause frames or (ii) ending providing of the one or more pause frames to the upstream network device, allowing traffic to flow from the upstream network device to the at least one network device of the one or more network devices;
- based at least in part on the precise latency induced within the network, determining congestion at the at least one network device of the one or more network devices; and
- based at least in part on determining congestion at the at least one network device of the one or more network devices, evaluating one or more functions of the at least one network device of the one or more network devices,
- wherein an operating protocol within the network comprises a priority-based flow control (PFC) protocol, and wherein the PFC protocol provides a link-level flow control mechanism that is controlled independently for each class of service (CoS).

16. The one or more non-transitory computer-readable media of claim 15, wherein evaluating one or more functions of the at least one network device of the one or more network devices comprises evaluating marking of packets within the at least one network device of the one or more network devices as having encountered congestion.

17. The one or more non-transitory computer-readable media of claim 15, wherein evaluating one or more functions of the at least one network device of the one or more network devices comprises evaluating selective dropping of packets.

18. The one or more non-transitory computer-readable media of claim 15, wherein evaluating one or more functions of the at least one network device of the one or more network devices comprises evaluating moving of packets from one part of the at least one network device of the one or more network devices to another part of the at least one network device of the one or more network devices.

* * * * *